MEMORY ELEMENT USING TWO-VALLEY SEMICONDUCTOR

Filed April 12, 1966 2 Sheets-Sheet 1

INVENTOR
M. UENOHARA
BY
A. J. Torsiglieri
ATTORNEY 3,508,210

MEMORY ELEMENT USING TWO-VALLEY SEMICONDUCTOR

Michiyuki Uenohara, Scotch Plains, N.J., assignor to Bell Telephone Laboratories, Incorporated, New York, N.Y., a corporation of New York Filed Apr. 12, 1966, Ser. No. 542,168
Int. Cl. G11c *11/36*
U.S. Cl. 340—173 5 Claims

ABSTRACT OF THE DISCLOSURE

Circuits are disclosed for utilizing the discovery that a two-valley semiconductor will continue to oscillate after the bias voltage falls below the threshold required to initiate oscillation provided the bias voltage remains above a minimum sustaining voltage of oscillation. These circuits test the presence or absence of oscillatory power, the amplitude of the average current flow, or the state of the resistivity in the two-valley semiconductor.

This invention relates to circuit arrangements which include as an active element thereof an element of a compound semiconductor in which the transfer of high energy electrons between conduction-band valleys with different mobilities and separated in energy by a fraction of an electron-volt can produce electrical instabilities useful in providing coherent oscillations.

The basic theory of operation of "two valley" semiconductors as such semiconductors are described for the sake of brevity is now well understood and is set forth in detail in a number of papers in the special issue on semiconductor bulk-effect and transit-time devices of the I.E.E.E. Transactions on Electron Devices, January 1966.

In particular, it is known that if the voltage applied to a suitable sample of a suitable two-valley semiconductor, such as n-type gallium arsenide, is increased, the average sample current increases almost linearly to a maximum value and then drops suddenly to between 60 and 90 percent of this maximum value. Above this critical voltage, the average sample current remains almost constant. However, if one observes the instantaneous sample current wave form, it is seen to oscillate periodically at a frequency determined by the sample length. This critical voltage will be termed the threshold voltage of oscillation, $V_T$.

In particular, it is now understood that the oscillatory state is associated with the creation and travel of a high-field domain through the sample from the negative electrode to the positive electrode. Even if the bias voltage is suddenly dropped below the threshold value, the high field domain does not disappear but continues to drift towards the positive electrode so long as the voltage bias is kept above a minimum value to be termed the sustaining voltage of the domain $V_D$.

Moreover, I have now discovered that even after the traveling domain initially formed is dissolved upon reaching the positive electrode, a new high-field domain can be formed at the negative electrode for travel to the positive electrode even if the bias voltage is below the threshold voltage, provided that the bias voltage is kept above a critical value to be termed the sustaining voltage of oscillation $V_S$. This voltage is intermediate between the threshold voltage and sustaining voltage of the domain, and typically is about 95 percent of the threshold voltage.

Presumably, this action occurs because the sudden change in the field distribution associated with the dissolution of a traveling domain as it reaches the positive electrode gives rise to a transient in the external circuit able to trigger the onset of oscillations anew when the bias voltage is appropriately chosen.

The present invention involves the utilization of this discovery in circuit arrangements, particularly circuit arrangements which exhibit memory, and so may be termed memory cells.

In particular, in accordance with this invention the memory cell comprises basically an element of a two-valley semiconductor, of the kind described, serially connected with a source of bias voltage which maintains the diode at a point where a suitable triggering pulse superposed on the bias voltage will switch the element to an oscillatory state which will persist even after cessation of the triggering pulse. Accordingly, the circuit exhibits memory. Additionally, the basic cell includes provision for reading out its state under control of suitable read-out pulses. A cell of this kind has the advantages associated with two-valley semiconductor oscillators, i.e. high speed and relatively high power.

The invention will be better understood from the following more detailed description taken in conjunction with the accompanying drawing, in which.

Figure 1A:
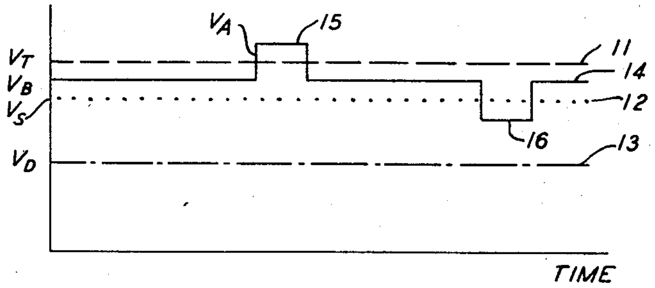
FIGS. 1A–1C show waveforms which will be helpful in explaining the basic principles of the invention.

With reference now to the drawing, in FIG. 1A there is plotted against time the various voltages of interest. The threshold voltage $V_T$ needed to be applied to a two-valley semiconductor element for the initiation of a traveling domain in the sample and the creation of oscillations in an external circuit is shown by the dashed line 11. The lower sustaining voltage of oscillation $V_S$ is shown as the dotted line 12. The still lower sustaining voltage for domain travel $V_D$ is shown by the dot-dash line 13. The solid line 14 shown corresponds to the effective applied voltage $V_A$ having a stead value $V_B$ intermediate between $V_T$ and $V_S$ on which there is superposed in turn a triggering pulse of amplitude sufficient to bring $V_A$ above $V_T$ as shown at 15 and an erasing pulse of opposite polarity and of sufficient amplitude to bring $V_A$ below $V_S$ as shown at 16. The voltage $V_S$ can be made to approach the voltage $V_T$ by decreasing the product $n$L, where $n$ is the carrier concentration and L is the length of the sample.

Figure 1B:
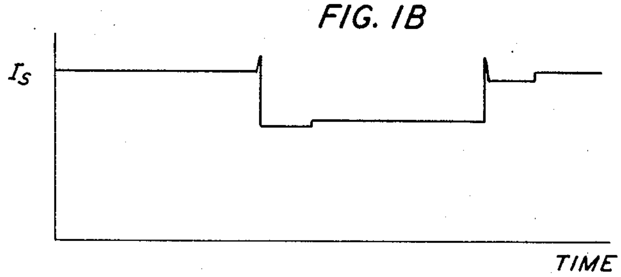

FIG. 1B shows plotted against time the average current $I_S$ flowing through the sample corresponding to application of the voltage $V_A$ to the sample. It is noted that the current is initially high, remaining so until $V_A$ exceeds $V_T$, at which point it falls to a lower value, which lower value is maintained until $V_A$ falls below $V_S$. As seen there are additional minor perturbations in the current, which are of little interest, associated with changes in $V_A$.

Figure 1C:
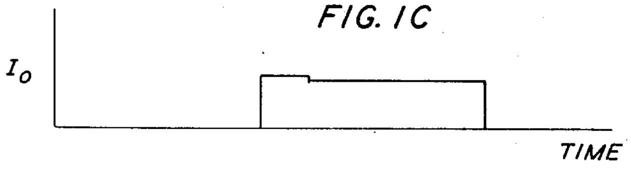

In FIG. 1C there is shown the peak amplitude of the oscillatory current which appears in an external circuit including the sample, a load and a source of the applied voltage. It can be seen that the oscillatory current flows essentially from the time $V_A$ exceeds $V_T$ corresponding to the superposition of the triggering pulse on the steady bias until $V_A$ falls below $V_S$ corresponding to the superposition of the erasing pulse on the steady bias. From FIG. 1B it can be seen that this interval of oscillatory current flow also corresponds to the low current state of the sample.

Accordingly, it can be seen that information as to whether or not a triggering pulse has previously been applied to the sample can be derived either by testing the presence or absence of oscillatory power, the average current flow, or the resistivity state of the sample.

A variety of techniques therefore are feasible for reading out the state of the memory cell depending on the form in which the read-out information is desired.

Figure 2:
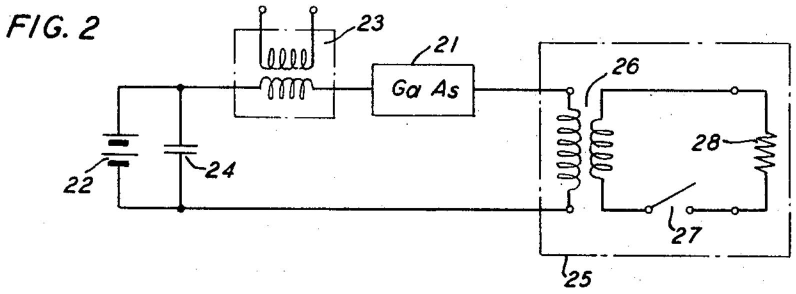
FIGS. 2 through 5 are circuit schematics of different embodiments of memory cells in accordance with the invention.

In FIG. 2 is shown schematically a circuit arrangement which employs nondestructive read-out and in which the desired output information is derived by determining the oscillatory state of the cell. In this arrangement, the output information is itself in high frequency form, a factor which sometimes may be advantageous in facilitating utilization of the information.

The arrangement of FIG. 2 comprises a gallium arsenide element or diode 21 of the kind described, and associated therewith is the D-C voltage source 22 suitably adjusted to bias diode 21 to the point $V_S$, shown in FIG. 1A, corresponding to a voltage short of that needed to initiate oscillations but sufficient to sustain oscillations once initiated. Read-in information source 23 is connected serially with diode 21 and D-C source 22 to inject controllably a voltage pulse of polarity and amplitude appropriate, when superposed on the bias provided by source 22, to initiate oscillations. Typically, the turn off or erasing pulses needed to turn off oscillations previously initiated are injected here, too, under control of auxiliary circuitry. In this figure, for purposes of illustration, read-in source 23 is shown as a transformer to whose primary winding the read-in pulses are applied and whose secondary winding is connected serially with bias source 22 and diode 21. At microwave frequencies, the read-in source, as well as the rest of the circuit, would take a more appropriate form in the manner known to workers in the art. A capacitance 24 serves to shunt any oscillatory current across bias source 22. Also serially connected is the read-out branch 25. As shown, the read-out branch comprises a transformer 26 whose primary winding is connected serially with the diode 21 and whose secondary winding is connected serially with a switch 27 and a load 28. The switch 27, shown schematically, typically would be an electronic switch under control of suitable read-out apparatus.

In operation, a triggering pulse supplied by read-in source 23 in order to store a binary digit in the memory cell would initiate oscillations by temporarily increasing the voltage applied to diode 21 beyond the value $V_T$. Even after cessation of this pulse, the oscillations would persist sustained by bias source 22. Upon closing of switch 27 in accordance with the read-out control, oscillations in the primary of transformer 26 would be transferred to load 28. If, however, the cell had not previously been triggered to oscillation, which situation corresponds to the other binary state of the cell, closing of switch 27 would leave unaffected load 28.

In the arrangement described, sampling of the state of the basic cell would be nondestructive so long as overload is avoided, and so can be repeated indefinitely until the oscillations are terminated by application of an erasing pulse to reduce the voltage applied to less than that needed to sustain oscillations.

Figure 3:
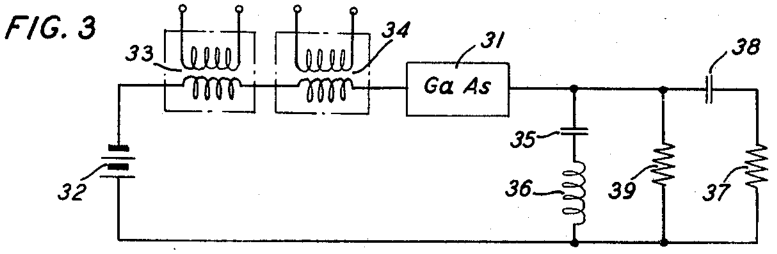

FIG. 3 shows an alternative arrangement in which the read-out of the information is destructive. In this arrangement, diode 31 of the kind previously described is connected serially with a D-C voltage source 32 which serves in the manner described for voltage source 22 in the circuit of FIG. 2. Read-in control branch 33 and read-out control branch 34 are each connected serially with diode 31 and D-C voltage source 32. Read-in and read-out control branches are each shown as transformers having their input windings supplied by auxiliary control apparatus and their secondary windings connected serially in the basic cell. Inductor 36 and capacitor 35 form an LC circuit tuned to the oscillatory frequency of the basic cell for shunting oscillatory currents from the load 37. Capacitor 38 is connected serially between the load 37 and the diode 31 to block the flow of direct-current in the load 37. A resistor 39 is connected across the LC combination 35, 36 to shunt the direct-current from the load.

Figure 6A:
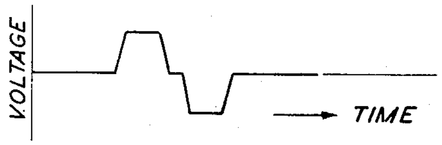
FIGS. 6A–6C are waveforms which will be helpful in describing the embodiment of FIG. 3.

In operation, a read-in pulse supplied by control branch 33 is used to initiate oscillations when desired. For read-out, a bipolar pulse of the waveform shown in FIG. 6A is applied by way of control branch 34. The amplitude of the read-out pulse is such that on the positive half it increases the voltage applied to the diode beyond the threshold value whereby oscillations would be initiated and on the negative half it reduces the applied voltage below the value needed to sustain oscillations whereby the diode is returned to its quiescent state.

As a consequence, if at the time the read-out pulse is applied the diode is in its non-oscillatory state, the positive half of the pulse will initiate oscillations and the negative half will terminate them. There will then result across the load 37 a bipolar pulse of the kind depicted in FIG. 6B, the negative half corresponding to the onset of oscillations and the positive half their cessation.

On the other hand, if at the time the read-out pulse is applied the diode is already in an oscillatory state as the result of earlier application of a read-in pulse, the positive half of the read-out pulse will little affect the current flow through the diode because of its relative insensitivity to further increases in applied voltage beyond threshold and so there will be no voltage change across the load. On the negative half of the read-out pulse, the oscillatory state will be terminated with a change in current flow through the diode and a voltage change across the load. As a consequence, the voltage across the load will have the waveform shown in FIG. 6C comprising a single positive pulse.

Figure 6B:
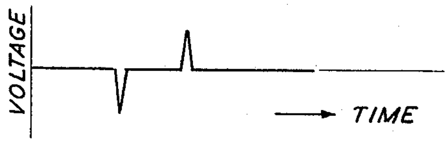
Figure 6C:
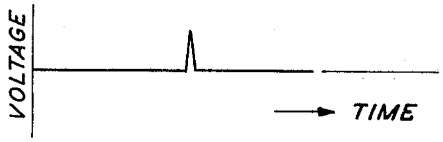

Moreover, if it is found desirable, by inserting a unidirectional conducting element poled to pass only negative pulses between load 37 and capacitor 38, the positive pulse shown in FIG. 6B can be removed.

Figure 4:
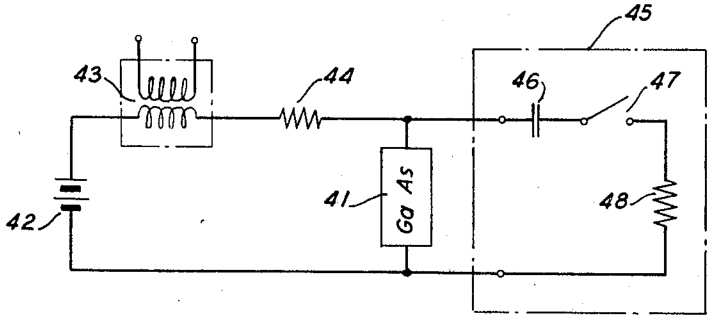

In FIG. 4, there is shown a circuit arrangement which in essence utilizes the resistivity state of the diode for reading out information stored in the basic cell. In this circuit, the diode 41, D-C voltage source 42 and the read-in branch 43 serve essentially the roles of the corresponding elements 31 through 33 included in the arrangement shown in FIG. 3. A current limiting resistor 44 advantageously is included in series with the diode, D-C voltage source, and the read-in circuit. The read-out is accomplished by the read-out branch 45 which is connected in shunt across the diode. The read-out branch includes the blocking capacitor 46, the switch 47, and the load 48. By closure of switch 47 under control of auxiliary read-out equipment not shown, there will be developed across the load a voltage which is a measure of the resistance state of the diode.

Figure 5:
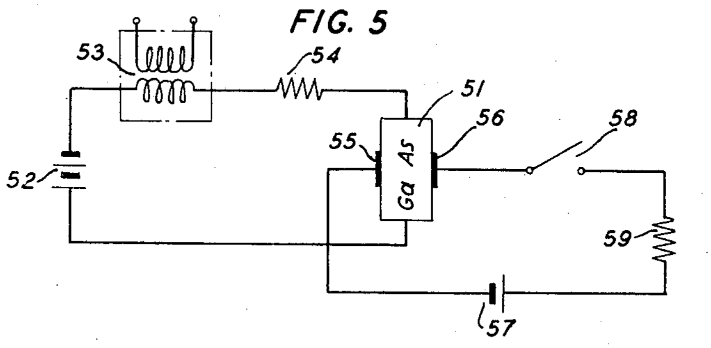

Still another way of reading out the state of the basic cell is illustrated in FIG. 5. In this arrangement, the sample 51, D-C voltage source 52, read-in control branch 53, and current limiting resistor 54 serve the roles of corresponding elements 41 through 44 of the arrangement shown in FIG. 4. Additionally, the sample 51 is provided with an additional pair of auxiliary electrodes forming ohmic contacts 55, 56 on opposite sides of the longitudinal axis to define therebetween a conduction path which is transverse to the path of the traveling domain when the sample is in its oscillatory state. It will be characteristic of the resistance between contacts 55 and 56 that it will increase significantly during the interval when the traveling domain passes longitudinally therebetween. This can be appreciated because the resistance between contacts 55 and 56 will be proportional to the mobility of the charge carriers in the portion of the sample extending therebetween, and when the traveling domain is occupying that portion of the sample the mobility of the charge carriers therein will be sharply reduced and so the resistance of this transverse path will increase correspondingly. To utilize this change in transverse resistance, there are connected serially between contacts 55 and 56 a read-out branch including a D-C voltage source 57, a switch 58, and a load 59. As before the switch 58 is under control of auxiliary read-out apparatus. While the switch is closed, the voltage across load 59 will be a measure of the transverse resistance measured between contacts 55 and 56. The read-out control is synchronized so that the switch 58 will be closed at the time a traveling domain should pass between contacts 55 and 56 if the basic cell is in an oscillatory state. Accordingly, there will be provided across load 59 an indication of whether the cell is or is not in its oscillatory state.

It can readily be appreciated that a plurality of cells of this kind can be employed to provide a summing arrangement. For such purpose, a plurality of cells are arranged so that separate binary digits are stored in each cell in parallel while the transverse paths through the samples are serially connected. In this fashion, the total current flowing serially across the samples provides an indication of how many of the cells are in an oscillatory state and, accordingly, the number of bits stored. It should be evident that such a circuit arrangement also is adaptable for use as a binary-to-analog converter.

From the foregoing discussion, it can be appreciated that a wide variety of techniques are available for ascertaining whether the basic cell is in an oscillatory state under control of auxiliary read-out apparatus. Ordinarily, the arrangement to be preferred is dependent on the form in which the information read out is best utilized thereafter.

It also is characteristic of two valley semiconductor oscillators of the kind described that the oscillatory frequency is inversely related to the length of the semiconductor sample. Because of the difficulty of achieving long samples of the desired uniformity, these oscillators presently are typically operated at relatively high frequencies where signal transmission is advantageously done by wave guides, strip lines, and coaxial cables and, accordingly, the basic cell needs to be appropriately adapted.

Moreover, for most applications, it is important to have a large number of basic cells whereby a large number of binary digits can be stored. To this end, many of the techniques used with other basic unit memory cells to achieve a large memory are similarly applicable here. For example, to facilitate random access read-out with a minimum of leads, it is now common to arrange the basic cells in a two-coordinate array.

For such applications where it is desired to utilize a large number of cells, particularly if the cells are to be used in a two-coordinate array of high density, it is convenient to assemble the array as follows. One begins by epitaxial deposition of a layer of low resistivity gallium arsenide of suitable thickness on a substrate of high resistivity gallium arsenide. By masking and etching techniques common in the semiconductor art, the epitaxial layer may be divided into a large number of individual islands of low resistivity material on the high resistivity substrate, each of the islands being of a size suited for use as the element of a separate memory cell. The necessary connections to the array of elements are then provided by conductive films deposited on the substrate appropriately separated by insulating films.

Other circuit applications of a two-valley semiconductor are described in my related application filed contemporaneously with this application Ser. No. 542,170, filed Apr. 12, 1966 and assigned to the same assignee as this application.

What is claimed is:

1. A circuit arrangement comprising a two-valley semiconductor in which traveling electric field domains are initiated and propagated, means for biasing the semiconductor below the threshold voltage of oscillation but above the sustaining voltage of oscillation, means for superposing on the bias voltage selectively under the control of signal information a first voltage pulse of amplitude sufficient to increase the voltage applied to the semiconductor beyond the threshold voltage of oscillation, whereby domains are initiated and oscillations commence, means for superposing on the bias voltage a second voltage pulse of amplitude and polarity sufficient to decrease the voltage applied to the semiconductor below the sustaining voltage of oscillation, whereby any oscillations cease, and means for reading out the state of the semiconductor (under the control of read-out information).

2. A circuit arrangement in accordance with claim 1 in which the read-out means samples the oscillatory state of the semiconductor.

3. A circuit arrangement in accordance with claim 1 in which the read-out means samples the current state of the semiconductor.

4. A circuit arrangement in accordance with claim 1 in which the read-out means samples the resistivity state of the semiconductor.

5. A circuit arrangement in accordance with claim 4 in which the semiconductor includes a pair of auxiliary electrodes, and in which the read-out means are connected across said auxiliary electrodes to sample changes in the resistance of the semiconductor between said auxiliary electrodes.

References Cited

UNITED STATES PATENTS

| | | | |
|---|---|---|---|
| 3,089,126 | 5/1963 | Miller | 340—173 |
| 3,105,957 | 10/1963 | Li | 340—173 |
| 3,398,321 | 8/1968 | Langberg | 331—132 |
| 3,365,583 | 1/1968 | Gunn. | |

OTHER REFERENCES

D. E. McCumber et al., Theory of Negative-Conductance Amplification and of Gunn Instabilities in "Two-Valley" Semiconductors, IEEE Transactions on Electron Devices, V. Ed.–13, No. 1, January 1966, p. 9.

Gunn: The Gunn Effect, International Science and Technology, October 1965, p. 43 at p. 44–45.

Englemann: Oscillations in Bulk GaAs Due to an Equivalent Negative RF Conductance, Proceedings of the IEEE, May 1966, pp. 786–788.

Bowers: A Solid-State Source of Microwaves, Scientific American, August 1966, p. 22 at p. 28.

Heiserman: Gunn Oscillators, Electronics World, September 1967, p. 42.

TERRELL W. FEARS, Primary Examiner

H. BERNSTEIN, Assistant Examiner

U.S. Cl. X.R.

331—107